(12) United States Patent
Britton et al.

(10) Patent No.: US 10,814,384 B2
(45) Date of Patent: Oct. 27, 2020

(54) APPARATUS FOR MOULDING BATTERY COMPONENTS

(71) Applicant: TBS ENGINEERING LIMITED, Gloucester (GB)

(72) Inventors: Simon Anthony Britton, Gloucester (GB); David Voden, Gloucester (GB)

(73) Assignee: TBS ENGINEERING LIMITED, Gloucester (GB)

( * ) Notice: Subject to any disclaimer, the term of this patent is extended or adjusted under 35 U.S.C. 154(b) by 275 days.

(21) Appl. No.: 15/769,334

(22) PCT Filed: Oct. 14, 2016

(86) PCT No.: PCT/GB2016/053200
§ 371 (c)(1),
(2) Date: Apr. 18, 2018

(87) PCT Pub. No.: WO2017/068329
PCT Pub. Date: Apr. 27, 2017

(65) Prior Publication Data
US 2018/0304355 A1 Oct. 25, 2018

(30) Foreign Application Priority Data

Oct. 19, 2015 (GB) .................................. 1518467.4

(51) Int. Cl.
*B22D 35/06* (2006.01)
*B22D 25/04* (2006.01)
(Continued)

(52) U.S. Cl.
CPC ............. *B22D 35/06* (2013.01); *B22D 25/04* (2013.01); *B22D 27/04* (2013.01); *H01M 2/28* (2013.01); *H01M 10/12* (2013.01); *B22D 19/04* (2013.01)

(58) Field of Classification Search
CPC ........ B22D 19/04; B22D 25/04; B22D 27/04; B22D 35/06
(Continued)

(56) References Cited

U.S. PATENT DOCUMENTS

2011/0146934 A1    6/2011  Neal et al.

FOREIGN PATENT DOCUMENTS

| ES | 2140338 A1 | 2/2000 |
| GB | 2023471 A | 1/1980 |

(Continued)

OTHER PUBLICATIONS

Search Report for International application No. PCT/GB2016/053200, dated Jan. 12, 2017.
(Continued)

*Primary Examiner* — Kevin P Kerns
(74) *Attorney, Agent, or Firm* — Marshall, Gerstein & Borun LLP

(57) ABSTRACT

An apparatus for moulding battery components including a molten metal feed trough, a mould block adjacent to the feed trough, a weir between the feed trough and each cavity and a supply for feeding molten metal to the feed trough. The mould block has at least one mould cavity and a cooling arrangement which cools the mould block, and the mould block is provided with a heating arrangement adjacent to the or each mould cavity. In use, the heating arrangement maintains at least part of the, or each, mould cavity at an elevated temperature relative to the average operational temperature of the mould block.

11 Claims, 3 Drawing Sheets

(51) Int. Cl.
    *B22D 27/04*     (2006.01)
    *B22D 19/04*     (2006.01)
    *H01M 2/28*      (2006.01)
    *H01M 10/12*     (2006.01)

(58) Field of Classification Search
    USPC ....... 164/108, 109, 110, 332, 333, 334, 129,
                 164/130, 322, 133, 337; 249/82, 83
    See application file for complete search history.

(56)                References Cited

FOREIGN PATENT DOCUMENTS

JP          H09164469 A      6/1997
JP          2011031262 A     2/2011

OTHER PUBLICATIONS

Written Opinion for International application No. PCT/GB2016/053200 dated Jan. 12, 2017.
Search Report for Great Britain Application No. GB1518467.4, dated Jan. 13, 2016.

SECTION H-H

APPARATUS FOR MOULDING BATTERY COMPONENTS

FIELD OF THE INVENTION

The present invention relates to an apparatus for moulding battery components and a method of moulding battery components.

BACKGROUND OF THE INVENTION

The term "battery" is used herein to include accumulators. In a conventional lead-acid battery it is customary to connect together the plates of each stack by means of a lead strap or post which is fixed to aligned lugs or tabs on the plates.

In the manufacture of batteries, particularly for example lead acid batteries, it is known to cast battery components. Components such as straps and other formations can also be simultaneously cast onto the lugs of battery plates so as to, for example, form a connection between a set of plates within a cell of the battery. Such straps are generally cast by filling a mould cavity with lead and dipping lugs into the cavity prior to the cooling of the lead. Typically, the mould cavities are filled by allowing lead to flow into channels at the sides of the cavities and spill over a weir into the mould.

An example of a typical casting apparatus is shown in the Applicant's earlier application WO94/16466 in which the apparatus includes a mould having a set of post or strap mould cavities, a molten metal feed duct adjacent thereto, a weir between the feed duct and the cavities, means for supplying molten lead to the duct, and hence the cavities, a pump and at least a pair of substantially parallel feed passages extending below the duct and connected to the duct.

It is known to provide a casting apparatus with water cooled mould blocks. The molten lead flows over the weir, into the cavities and solidifies. However, some portions of the cast component can solidify before the lead has fully settled horizontally within the mould cavity. The result of the premature solidifying is that the cast component has a lip formation, or protrusion, around part or all the perimeter of the mould cavity, in other words adjacent to the mould cavity walls.

The premature cooling of part of a cast component can be particularly problematic, when a section or part of the mould cavity has a reduced cross-sectional area and/or is remote from the source of molten metal. In this case, in this part of the mould cavity the metal adjacent to the cooled walls cools much more rapidly than molten metal further from the walls resulting in a distinct lip upstanding from the average surface level of the cast component.

This can be particularly problematic for cast battery straps. The cast components are upturned and assembled into battery packs, which means that the lip (or protrusion) faces into the battery pack compartment where the battery plates are provided. If the component contacts the plates, there is a risk of a short circuit. When a large lip is formed on the component, the risk is greater. It has not been possible to consistently eliminate the formation of the lip. Therefore manufacturers have had to provide a sufficient clearance between the lower edge of the cast component and the plates to avoid the risk of short circuit.

Embodiments of the invention seek to provide an apparatus which overcome some of these problems.

SUMMARY OF INVENTION

According to a first aspect of the present invention there is provided an apparatus for moulding battery components including:

a molten metal feed trough;
a mould block adjacent to the mould block, the mould block having at least one mould cavity and a cooling arrangement which in use cools the mould block;
a weir between the feed trough and the or each cavity;
a supply for feeding molten metal to the feed trough;
wherein the mould block is provided with a heating arrangement adjacent to the or each mould cavity, which in use maintains at least part of the or each mould cavity at an elevated temperature relative to the average operational temperature of the mould block.

The feed trough may be heated to an elevated operational temperature, in order to deliver molten metal, for example lead, to the mould. A typical operating temperature for the supply of molten lead is approximately 450 C. It will be appreciated that different operating temperatures will be required for different molten metals.

The heating arrangement provides localised heating of the or each mould cavity to an elevated temperature relative to the average operational (or moulding) temperature of the mould block. The heating arrangement may provide localised heating of at least part of the or each mould cavity, such that in use, the at least part of the or each cavity is maintained at a temperature approximately 20 to 40 C above the average operational temperature of the mould block.

The mould block may provided with a plurality of mould cavities, each cavity being provided with a heating arrangement. The mould block may have a longitudinally extending form with several mould cavities provided along its length.

The mould block may include an outer edge extending parallel to the feed trough. The heating arrangement may be provided on the outer edge of the mould block.

The or each cavity may include a first portion adjacent to the weir, and a second portion remote from the weir. The respective heating arrangement may maintain the second portion at a temperature above the average operational temperature of the mould block.

The heating arrangement may be provided adjacent to the second, remote portion of the or each mould cavity. The heating arrangement may be provided beneath the second, remote portion of the or each mould cavity. The heating arrangement may be provided above the second, remote portion of the or each mould cavity.

The or each mould cavity may have a section with reduced cross-sectional area. The respective heating arrangement may maintain the section with reduced cross-sectional area at a temperature above the average operational temperature of the mould block.

The heating arrangement may be provided adjacent to the section with reduced cross-sectional area. The heating arrangement may be provided beneath the section with reduced cross-sectional area. The heating arrangement may be provided above the section with reduced cross-sectional area.

The section of reduced cross-sectional area may be remote from the weir. The section of reduced cross-sectional area may have reduced width and/or depth. The or each cavity may be formed having an L-shape when viewed from above, wherein one leg of the L-shape is remote from the weir.

The cooling arrangement may be a water-fed cooling system.

The heating arrangement may include a thermally conductive element provided between the mould block and adjacent feed trough, such that heat is transferred from the feed trough to the mould block.

The heating arrangement may include two or three thermally conductive elements provided between the mould block and the feed trough. The heating arrangement may include any suitable number of thermally conductive elements provided between the mould block and the feed trough, for example for large mould cavities several elements may be required. The thermally conductive elements may be provided integrally with the mould block. The thermally conductive elements may be coupled to an outer edge of the mould block. The feed trough may extend longitudinally along the upper surface of a support block. The thermally conductive elements may be provided integrally on the support block. The thermally conductive elements may be provided above a part of the or each mould cavity.

The heating arrangement may include a thermally conductive element provided within the mould block and thermally connected to the feed trough (or another heat source), such that heat is transferred from the feed trough to the mould block. The thermally conductive elements may be provided in the mould block adjacent or beneath a part of the or each mould cavity.

The heating arrangement may include a heating element which is thermally connected to the feed trough or to another heat source. The heating arrangement may include two, three or any suitable number of heating elements, for example for large mould cavities and/or cavities having complex geometry several may be required. Several heating elements may be provided in the mould block adjacent to or underneath a part of the or each mould cavity.

The heating arrangement may include at least one thermal bridge provided adjacent to the mould block.

The heating arrangement may include two or three heat bridges (or thermal bridge) provided between the mould block and the feed trough. The heating arrangement may include any suitable number of heat bridges provided between the mould block and the feed trough, for example for large mould cavities several heat bridges may be required. The heat bridge(s) may be provided integrally with the mould block. The heat bridge(s) may be coupled to an outer edge of the mould block. The feed trough may extend longitudinally along the upper surface of a support block. The heat bridge(s) may be provided integrally on the support block.

The apparatus may further include a second mould block, provided adjacent and parallel to the first mould block, the second mould block having at least one mould cavity and a cooling arrangement which in use cools the mould block. A second molten metal feed trough may be provided adjacent to the second mould block and extending along the length of the second mould block. A plurality of weirs may extend between the second feed trough and the or each of the cavities. A second supply may be arranged for providing molten metal to the second trough. The second mould block may be provided with a localised heating arrangement adjacent to the or each mould cavity, which in use maintains at least part of the or each mould cavity at a temperature above an average operational temperature of the mould block.

The or each supply may comprise a feed passage extending below the feed trough. The or each supply may further comprise a plurality of substantially vertically extending passages connecting the feed passage to the feed trough. The or each supply may further comprise a supply pump inlet in fluid communication with the feed passage, for connection to a pump supplying molten metal.

Typically, the apparatus may extend longitudinally and the supply pump is provided at one end of the apparatus.

According to a further aspect of the present invention, there is provided a method of moulding battery components including:

providing an apparatus for moulding battery components including: a molten metal feed trough; a mould block adjacent to the mould block, the mould block having at least one mould cavity and a cooling arrangement; a weir between the feed trough and the or each cavity; and a molten metal supply arrangement;

cooling the mould block;

heating at least a part of the or each mould cavity to a temperature above an average temperature of the mould block with the heating arrangement;

supplying molten metal into the feed trough so that the so that the molten metal flows over the weirs into the or each mould cavity;

stopping the supply of molten metal when level of metal in the or each mould cavity has reached the required level; and allowing the metal to solidify in the or each mould cavity.

The or each cavity includes a first portion adjacent to the weir, and a second portion remote from the weir, and the step of heating the at least a part of the or each mould cavity may include maintaining the second portion at a temperature above the average operational temperature of the mould block the step of heating the at least a part of the or each mould cavity.

The or each mould cavity may have a section with reduced cross-sectional area, and the step of heating the at least a part of the or each mould cavity may include maintaining the section with reduced cross-sectional area at a temperature above the average operational temperature of the mould block.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DESCRIPTION OF AN EMBODIMENT

Figure 1:
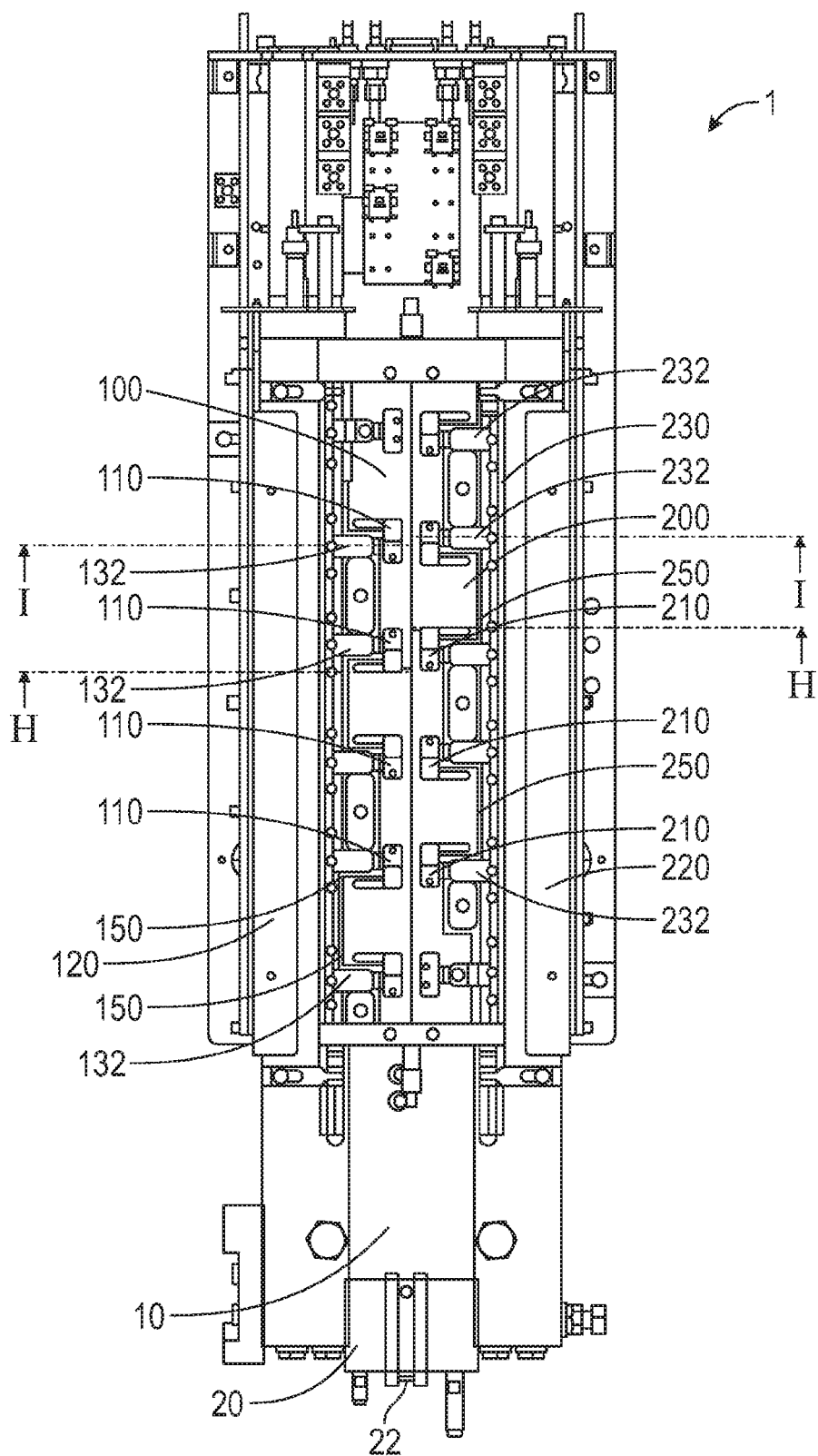
FIG. 1 is a schematic representation of a plan view of an apparatus according to an embodiment of the invention.

FIG. 1 shows a plan view of an apparatus 1 for moulding battery components according to an embodiment of the invention. The apparatus 1 includes a left (or first) mould block 100 and a right (or second) mould block 200. In this embodiment the left mould block 100 is integrally formed with the right mould block 200. However, the two mould blocks could also be formed separately.

A left support block 120 is secured to the left side of the left mould block 100; and a right support block 220 is secured to the right side of the right mould block 200.

Each mould block 100, 200 has a longitudinally extending form with several mould cavities 110, 210 provided along its length.

Left and right feed troughs 130, 230 extend longitudinally along the upper surface of the left and right support blocks 120, 220. The left and right feed troughs are positioned along the outer edge of the left and right mould blocks 100, 200.

Figure 2:
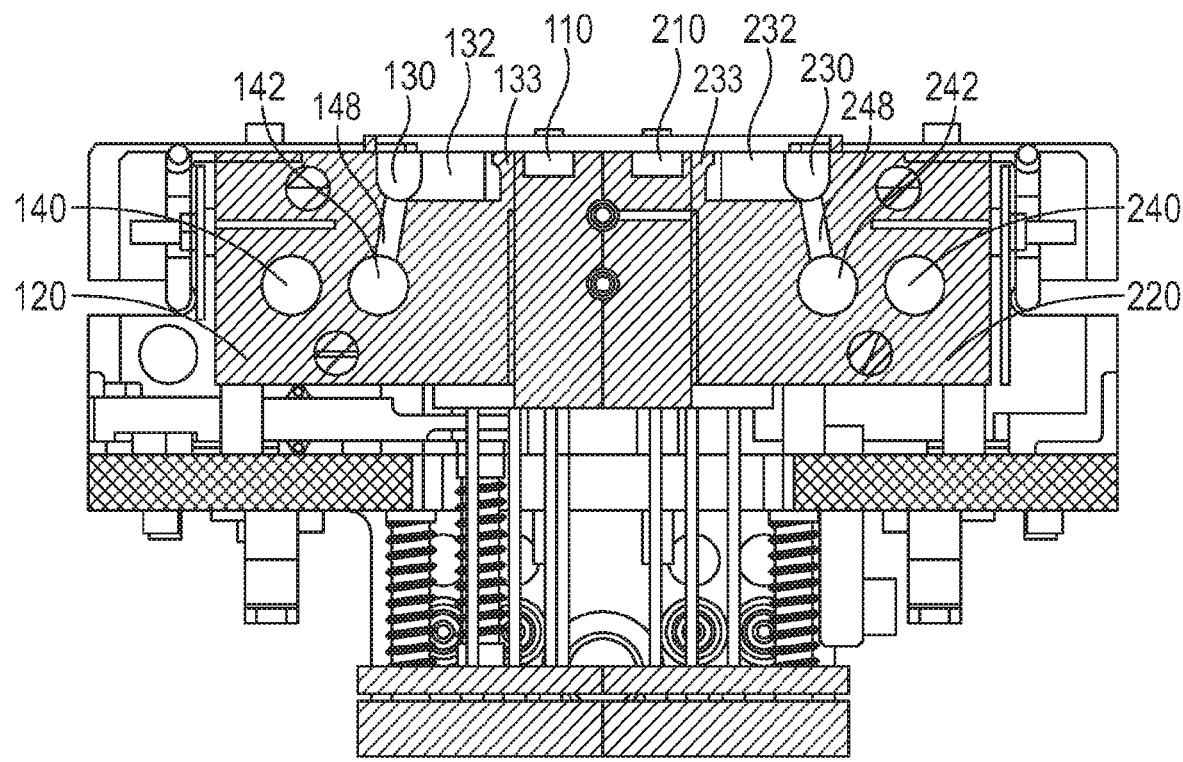
FIG. 2 is a schematic cross-sectional view of the apparatus of FIG. 1, taken through line I.

The left and right support blocks 120, 220 are joined at one end by a cross-member 10, the support blocks 120, 220 and cross member 10 thereby forming a u-shape when viewed from above. The cross-member 10 includes a T-connector 20 having an inlet 22 and two outlets (not shown). In use, the inlet 22 is connected to a molten lead supply (not shown), which may include a pump assembly. As shown in FIG. 2 a left outer feed passage 140 is provided in the left support block 120, which is use is fluid connection with the left outlet or branch of the T-connection. A right outer feed passage 240 provided in the right support block 220 is in fluid connection with the right branch of the T-connector 20. The outer feed passages 140, 240 extend longitudinally in the support blocks along substantially the length of the apparatus 1.

As shown in FIG. 2, a left inner feed passage 142 is provided in the left support block 120 substantially parallel to the left outer feed passage 140. The left inner feed passage 142 extends longitudinally along the apparatus and is provided below the left feed trough 130. Similarly a right inner feed passage 242 is provided in the right support block 220, extending substantially parallel to the right outer feed passage 240 and below the right feed trough 230.

The left inner feed passage 142 and left outer feed passage 140 are fluidly connected at a mid point. A similar fluid connection is provided between the right inner and outer feed passages 240, 242. The inner feed passages 142, 242 are connected to each respective feed trough 130, 230 by means of a plurality of substantially vertically extending passages 148, 248.

As can be seen from FIG. 1, along the feed troughs 130, 230 narrow supply channels 132, 232 extend generally perpendicularly to the longitudinal direction from the feed trough towards each mould cavity 110, 210. At the end of each supply channel 132, 232, and in alignment with the respective mould cavities 110, 210, is a weir 133, 233.

Figure 3:
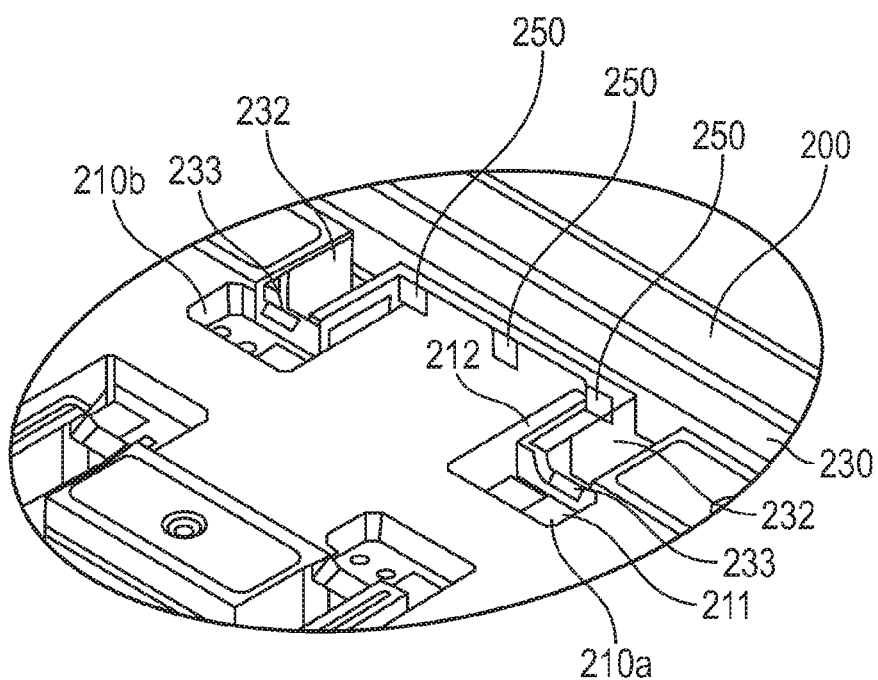
FIG. 3 is a schematic perspective close up view of the apparatus of FIG. 1.

FIG. 3 is an enlarged representation of a perspective view from above of a part of the second mould block 200 and second feed trough 230. In this close up view, two adjacent mould cavities 210a and 210b are illustrated. Looking at cavity 210a, it can be seen that each mould cavity is substantially L shaped when viewed from above, having a first leg 211 adjacent to the weir 233 and extending longitudinally relative to the apparatus 1 and a second leg 212, substantially perpendicular to the first leg, extending towards the feed trough 230. The second leg 212 has a reduced cross-sectional area relative to the first leg 211. The first leg 211 is proximal to the weir 233, and the second leg 212 is remote from the weir 233.

Thermally conductive blocks 250 are aligned longitudinally between the second mould block 200 and the second feed trough 230. The blocks 250 are therefore provided adjacent an end of the second leg 212 the mould cavity. The blocks 250 may be provided integrally with or coupled to the mould block 200. Thermally conductive blocks 150, 250 are similarly arranged along the longitudinal outer edge of the first and second mould blocks alongside each of the mould cavities 110, 210.

In the embodiment shown, there are three thermally conductive blocks 250 provided between adjacent mould cavities 210a and 210b. The invention is not limited to this embodiment and in other embodiments (not shown), alternative arrangements of thermally conductive blocks may be provided, for example two or four thermally conductive blocks.

Figure 4:
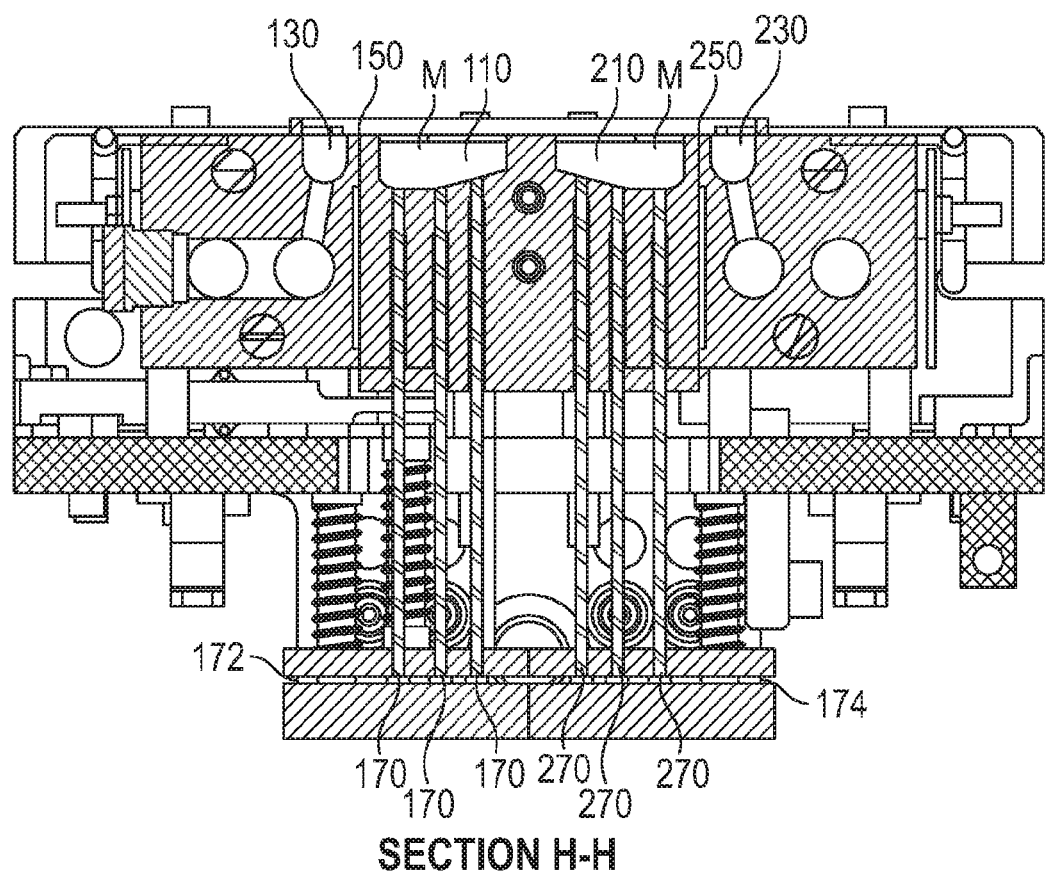
FIG. 4 is a schematic cross-sectional view of the apparatus of FIG. 1, taken through line H.

FIG. 4 is a cross section through line H of FIG. 1, and shows a cross-sectional view through mould cavities in the two mould blocks. The two mould blocks 100, 200 are provided with water-fed cooling pipes 170, 270. The cooling pipes are connected to a water inlet and outlet 172, 174.

In use, the cooling pipes 170, 270 are connected to the water supply and water outlet, and cooled water is continually pumped through the pipes to cool the mould blocks.

A supply (not shown) is connected to the inlet 22, and is operated to pump molten metal, such as for example molten lead, into the apparatus 1 through the inlet 22. The molten metal flows through the T-branches; along the outer feed passages 140, 240; through the connections and into the inner feed passages 142, 242. As the volume of molten metal in the apparatus increases, the molten metal rises up through the vertical passages 148, 248 and into the feed troughs 130, 230. The feed troughs 130, 230 are heated (typically to an operational temperature of approximately 430 C to 480 C) in order to ensure smooth flow of the molten metal.

As more molten metal flows into the apparatus 1, the level of molten metal in the feed troughs 130, 230 rises. When the level of molten metal in the trough 130, 230 rises above the uppermost point of the weir 133, 233, the metal flows over the weirs and into the cavities 110, 210. The molten metal M fills the cavities 110, 120. When the cavities 110, 120 are filled to the required level, the molten metal supply is turned off.

The cooling pipes 170, 270 cool the mould blocks (typically to an average operational temperature of approximately 140 to 160 C) which allows the molten metal to solidify to form the cast components. The arrangement of the cooling pipes in this embodiment is purely schematic, and it will be appreciated that any suitable arrangement can be used.

The heating blocks 150, 250 conduct thermal energy from the heated feed troughs 130, 230 to the mould blocks 100, 200. This provides localised heating of the mould blocks 100, 200 in the areas around the second leg of each mould cavity. This means that this part of the mould cavity is maintained at a slightly elevated temperature compared to the average operational temperature of the mould block. Typically, the localised heating elevates the temperature by approximately 15 to 35 C. The elevated temperature of this part of the mould cavity slows down the solidification of the molten metal, allowing the metal to settle horizontally within the cavity before full solidification occurs. The provision of the localised heating adjacent to the second, remote portion of the L-shaped cavity provides particular benefit because the second leg has a smaller cross sectional area that the first leg, and without localised heating tends to cool and solidify quicker than the first leg.

Figure 5A:
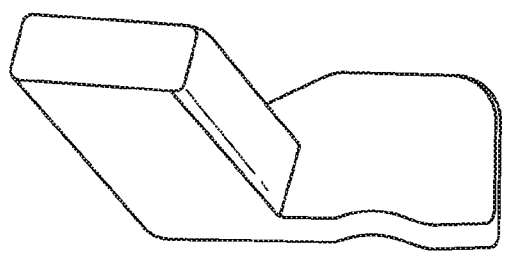
FIG. 5A is a schematic perspective view of a cast component made using the prior art casting apparatus.
Figure 5B:
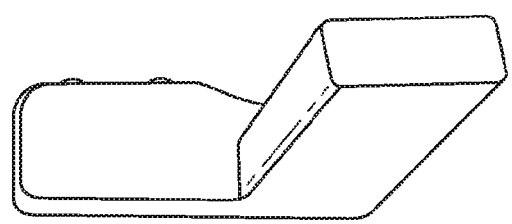
FIG. 5B is a schematic perspective view of a cast component made using the casting apparatus of FIG. 1.

As can be seen in FIG. 5B, the resultant cast metal component has a more uniform lower surface profile, with no protruding lip formation. For comparison, a cast metal component formed by the known method is shown in FIG. 5A.

Although the invention has been described with a heating arrangement provided adjacent to the mould block, it will be appreciated that the invention includes alternative heating arrangements. For example a heating arrangement could be provided above or below a part of the or each mould cavity as necessitated by the dimensions of the particular mould cavity and the settling characteristics of the molten metal, in order to locally raise the temperature of the mould cavity compared to the average operational temperature of the mould block.

While the invention has been described above with reference to one or more preferred embodiments, it will be appreciated that various changes or modifications may be made without departing from the scope of the invention as defined in the appended claims.

The invention claimed is:

1. An apparatus for moulding battery components, said apparatus comprising:
    a first molten metal feed trough;
    a first mould block adjacent to the first feed trough, the first mould block having a mould cavity and a cooling arrangement which in use cools the first mould block;
    a first weir between the first feed trough and the mould cavity; and
    a supply for feeding molten metal to the first feed trough;
    wherein the first mould block is provided with a heating arrangement adjacent to the mould cavity, which in use maintains at least part of the mould cavity at an elevated temperature relative to an average operational temperature of the first mould block,
    wherein the mould cavity comprises a first leg extending longitudinally relative to the apparatus, and a second leg extending substantially perpendicular to the first leg towards the first feed trough, the second leg of the mould cavity having a smaller cross-sectional area than the first leg of the mould cavity, and
    wherein the heating arrangement is provided adjacent to the second leg of the mould cavity between the first feed trough and the first mould block to maintain the second leg at an elevated temperature relative to the average operational temperature of the first mould block.

2. An apparatus according to claim 1, wherein the first mould block is provided with a plurality of mould cavities, each mould cavity being provided with a heating arrangement.

3. An apparatus according to claim 1, wherein the first mould block includes an outer edge extending parallel to the first feed trough, and the heating arrangement is provided on the outer edge of the first mould block.

4. An apparatus according to claim 1, wherein the first leg of the mould cavity is adjacent to the first weir, and the second leg of the mould cavity is remote from the first weir, and the heating arrangement maintains the second leg remote from the weir at a temperature above the average operational temperature of the first mould block.

5. An apparatus according to claim 1, wherein the cooling arrangement is a water-fed cooling system.

6. An apparatus according to claim 1, wherein the heating arrangement includes at least one thermally conductive element provided between the first mould block and the first feed trough.

7. An apparatus according to claim 1, wherein the heating arrangement includes a thermal bridge provided adjacent to the first mould block.

8. An apparatus according to claim 1, further comprising:
    a second mould block, provided adjacent and parallel to the first mould block, the second mould block having a mould cavity and a cooling arrangement which in use cools the second mould block;
    a second molten metal feed trough adjacent to the second mould block and extending along a length of the second mould block;
    a second weir between the second feed trough and the mould cavity; and
    a second supply for providing molten metal to the second trough,
    wherein the second mould block is provided with a localised heating arrangement adjacent to the mould cavity, which in use maintains at least part of the mould cavity at a temperature above an average operational temperature of the second mould block,
    wherein the mould cavity comprises a first leg extending longitudinally relative to the apparatus, and a second leg extending substantially perpendicular to the first leg towards the second feed trough, the second leg of the mould cavity having a smaller cross-sectional area than the first leg of the mould cavity; and,
    wherein the heating arrangement is provided adjacent to the second leg of the mould cavity between the second feed trough and the second mould block to maintain the second leg at an elevated temperature relative to the average operational temperature of the second mould block.

9. An apparatus according to claim 1, wherein the supply comprises:
    a feed passage extending below the first feed trough;
    a plurality of substantially vertically extending passages connecting the feed passage to the first feed trough;
    a supply pump inlet in fluid communication with the feed passage, for connection to a pump supplying molten metal.

10. A method of moulding battery components, said method comprising:
    providing an apparatus for moulding battery components, said apparatus including: a molten metal feed trough; a mould block adjacent to the feed trough, the mould block having a mould cavity and a cooling arrangement; a weir between the feed trough and the mould cavity; and a molten metal supply arrangement;
    cooling the mould block;
    heating at least a part of the mould cavity to a temperature above an average temperature of the mould block with a heating arrangement;
    supplying molten metal into the feed trough so that the molten metal flows over the weir into the mould cavity;
    stopping the supply of molten metal when a level of molten metal in the mould cavity has reached a required level; and
    allowing the molten metal to solidify in the mould cavity,
    wherein the mould cavity comprises a first leg extending longitudinally relative to the apparatus, and a second leg extending substantially perpendicular to the first leg towards the feed trough, the second leg of the mould cavity having a smaller cross-sectional area than the first leg of the mould cavity; and,
    wherein the heating arrangement is provided adjacent to the second leg of the mould cavity between the feed trough and the mould block to maintain the second leg at an elevated temperature relative to the average operational temperature of the mould block.

11. A method according to claim 10, wherein the first leg of the mould cavity is adjacent to the weir, and the second lea of the mould cavity is remote from the weir, and the step of heating the at least a part of the mould cavity includes maintaining the second leg remote from the weir at a temperature above the average operational temperature of the mould block.

\* \* \* \* \*